(12) United States Patent
Ono et al.

(10) Patent No.: US 12,407,416 B2
(45) Date of Patent: Sep. 2, 2025

(54) OPTICAL ACCESS NETWORK

(71) Applicant: NIPPON TELEGRAPH AND TELEPHONE CORPORATION, Tokyo (JP)

(72) Inventors: Shingo Ono, Musashino (JP); Chihiro Kito, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 227 days.

(21) Appl. No.: 18/269,885

(22) PCT Filed: Jan. 27, 2021

(86) PCT No.: PCT/JP2021/002780
§ 371 (c)(1),
(2) Date: Jun. 27, 2023

(87) PCT Pub. No.: WO2022/162773
PCT Pub. Date: Apr. 8, 2022

(65) Prior Publication Data
US 2024/0063911 A1    Feb. 22, 2024

(51) Int. Cl.
*H04B 10/275*    (2013.01)
*H04Q 11/00*    (2006.01)
(Continued)

(52) U.S. Cl.
CPC ..... *H04B 10/2755* (2013.01); *H04Q 11/0005* (2013.01); *H04B 10/03* (2013.01);
(Continued)

(58) Field of Classification Search
CPC .. H04B 10/2755; H04B 10/03; H04B 10/032; H04B 10/27; H04B 10/271;
(Continued)

(56) References Cited

U.S. PATENT DOCUMENTS 6,295,146 B1 * 9/2001 Nathan ............... G06F 11/2007
398/56
6,411,412 B1 * 6/2002 Jiang ................... H04J 14/0216
398/59
(Continued)

OTHER PUBLICATIONS

Ohno et al, Optical Access Network Design for Beyond 5G, Sep. 2020, NTT, BI-5-3, All Document. (Year: 2020).*
(Continued)

*Primary Examiner* — Dibson J Sanchez
(74) *Attorney, Agent, or Firm* — Harness, Dickey & Pierce, P.L.C.

(57) ABSTRACT

An object of the present invention is to provide an optical access network that has high reliability for supporting information communication services and efficiently responds to difficult-to-predict optical fiber demand.
An optical access network configuration according to the present invention includes an optical fiber cable 11 that is looped to connect a wiring section 25 and an exchange office 10 together (hereinafter, an upper loop), an optical fiber cable 21 that is looped and laid in each wiring section 25 (hereinafter, a lower loop), and an optical fiber switching function unit 31 installed at a connection point 30 between the upper loop 11 and the lower loop 21. The optical fiber switching function unit 31 is a wiring board or an optical switch which can be switched by connector connection. The wiring board or the optical switch may be remotely controllable.

5 Claims, 7 Drawing Sheets

(51) Int. Cl.
*H04B 10/03* (2013.01)
*H04B 10/032* (2013.01)
*H04B 10/27* (2013.01)
*H04J 14/02* (2006.01)

(52) U.S. Cl.
CPC ............ *H04B 10/032* (2013.01); *H04B 10/27* (2013.01); *H04B 10/271* (2013.01); *H04B 10/275* (2013.01); *H04J 14/0201* (2013.01); *H04J 14/0212* (2013.01); *H04J 14/022* (2013.01); *H04J 14/0283* (2013.01); *H04J 14/0287* (2013.01); *H04Q 2011/0041* (2013.01)

(58) Field of Classification Search
CPC ............ H04B 10/275; H04Q 11/0005; H04Q 2011/0041; H04J 14/0201; H04J 14/0212; H04J 14/022; H04J 14/0283; H04J 14/0287
USPC .......................................... 398/1–8, 43–103
See application file for complete search history.

(56) References Cited

U.S. PATENT DOCUMENTS

| | | | | |
|---|---|---|---|---|
| 6,616,349 B1* | 9/2003 | Li | .................. | H04J 14/0283 398/4 |
| 6,731,597 B1* | 5/2004 | Batchellor | .......... | H04J 14/0241 370/258 |
| 7,356,258 B1* | 4/2008 | Weverka | ............. | H04J 14/0241 398/59 |
| 8,412,042 B2* | 4/2013 | Ghioni | ................ | H04J 14/0283 398/59 |
| 9,509,408 B2* | 11/2016 | Simonneau | ......... | H04J 14/0283 |
| 9,529,775 B2* | 12/2016 | Lih | .................... | G06F 15/7825 |
| 2001/0017722 A1* | 8/2001 | Takachio | ........... | H04Q 11/0062 398/79 |
| 2002/0063925 A1* | 5/2002 | Otani | .................... | H04J 14/022 398/79 |
| 2002/0126350 A1* | 9/2002 | Sato | ...................... | H04J 14/022 398/7 |
| 2002/0145782 A1* | 10/2002 | Strasser | .............. | H04J 14/0212 398/59 |
| 2004/0071468 A1* | 4/2004 | Doh | ................... | H04Q 11/0066 398/59 |
| 2005/0019034 A1* | 1/2005 | Aoki | ..................... | H04J 14/022 398/59 |
| 2005/0196169 A1* | 9/2005 | Tian | .................... | H04J 14/0283 398/59 |
| 2005/0226265 A1* | 10/2005 | Takatori | ............ | H04Q 11/0478 370/452 |
| 2006/0115210 A1* | 6/2006 | Nakagawa | .......... | H04J 14/0246 385/24 |
| 2006/0133807 A1* | 6/2006 | Jenkins | ............... | H04J 14/0283 398/59 |
| 2006/0140625 A1* | 6/2006 | Ooi | ....................... | H04J 14/022 398/19 |
| 2006/0216029 A1* | 9/2006 | Vassilieva | ........... | H04J 14/0204 398/83 |
| 2006/0275035 A1* | 12/2006 | Way | .................. | H04J 14/02216 398/59 |
| 2007/0014573 A1* | 1/2007 | Wei | ...................... | H04B 10/275 398/59 |
| 2008/0145051 A1* | 6/2008 | Wellbrock | .......... | H04J 14/0286 398/59 |
| 2008/0304508 A1* | 12/2008 | Kawaguchi | ............ | H04Q 11/08 711/171 |
| 2010/0008669 A1* | 1/2010 | Rhy | .................... | H04J 14/0283 398/66 |
| 2010/0129076 A1* | 5/2010 | Barbarossa | ......... | H04J 14/0257 398/48 |
| 2011/0076016 A1* | 3/2011 | Wisseman | .......... | H04J 14/0204 398/83 |
| 2012/0082454 A1* | 4/2012 | Ooi | ....................... | H04J 14/0208 398/49 |
| 2012/0321310 A1* | 12/2012 | Spock | ..................... | H04L 12/18 398/59 |
| 2013/0084067 A1* | 4/2013 | Iwamura | ............. | H04J 14/0213 398/48 |
| 2014/0056565 A1* | 2/2014 | Harada | ................ | G02B 6/4495 385/100 |
| 2015/0237421 A1* | 8/2015 | Morgan | .............. | H04J 14/0283 398/45 |
| 2017/0339474 A1* | 11/2017 | Chen | ...................... | H04B 10/25 |
| 2018/0341060 A1* | 11/2018 | Oda | ....................... | H04J 14/052 |
| 2019/0379478 A1* | 12/2019 | Yuang | ................ | H04Q 11/0062 |
| 2023/0361875 A1* | 11/2023 | Yanagimachi | ..... | H04Q 11/0067 |

OTHER PUBLICATIONS

Yonemoto, Sonobe, Kigami, Hasegawa, and Miura, "Optical Wiring Method for Mass Opening and Rapid Response", NTT Technical Journal, vol. 18, No. 12, pp. 48-52, 2006 with machine generated English translation thereof.

* cited by examiner

OPTICAL ACCESS NETWORK

CROSS-REFERENCE TO RELATED APPLICATIONS

This application is a 371 U.S. National Phase of International Application No. PCT/JP2021/002780, filed on Jan. 27, 2021. The entire disclosure of the above application is incorporated herein by reference.

TECHNICAL FIELD

The present disclosure relates to a field of design techniques of optical fiber cable network configurations in access-based communication networks.

BACKGROUND ART

An optical access network is a network of communication equipment where base facilities of telecommunications carriers (hereinafter, exchange offices) and multiple user bases are connected by optical fiber cables. In order to stably provide information communication services, the network requires high reliability, and also requires efficient response to the demand for optical fibers that are scattered over the surface. Since the construction of an optical network requires a large amount of equipment, and time, and incurs high costs, it is important to design and construct an appropriate network structure in advance.

Optical access networks generally use a network configuration based on a star-shaped wiring topology (see NPL 1 for other details). In this network configuration, wiring sections each having about several hundred users as a unit are set, and the exchange office and the plurality of wiring sections are connected in a tree branch shape by an optical fiber cable. A number of required optical fibers calculated based on demand prediction at the time of design are fixedly allocated to each wiring section, and optical fiber cables are extended in a tree branch shape in the wiring section and connected to each user base.

CITATION LIST

Non Patent Literature

[NPL 1] YONEMOTO, SONOBE, KIGAMI, HASEGAWA, AND MIURA, "Optical Wiring Method for Mass Opening and Rapid Response," NTT Technical Journal, Vol. 18, No. 12, pp. 48-52, 2006.

SUMMARY OF INVENTION

Technical Problem

In a network configuration based on the conventional star-shaped topology, since a redundant path is not provided between an exchange office and a user base, there is a risk that a communication service will be interrupted if there is only one failure point accompanied by breakage. Further, since the optical fibers are fixedly allocated to each of the wiring sections and cable routes, even just one wiring section or cable route in which a demand for optical fiber exceeding the prediction at design time requires additional construction due to the switching and extension of the optical fibers. In order to reduce additional construction, it is necessary to lay more optical fibers than the predicted value in advance, leading to an increase in the creation cost and a decrease in the optical fiber use efficiency. That is, in the star-shaped network configuration, there are two problems that it is difficult to secure high reliability and that it is difficult to efficiently use an optical fiber with respect to demand fluctuations.

In particular, predicting the demand for optical fibers for mobile communication base stations, which have been increasing in recent years, is difficult because of the number and positions of the demand affected by various influences, such as radio wave propagation environment or communication traffic conditions, besides the requirement, of the reliability for the optical fibers, increased by the spread of new generation mobile communication systems. Therefore, in the star-type network configuration, there is a possibility that it will become difficult to secure the required reliability and to efficiently use the optical fiber as mobile communication services advance and expanded in the future.

The present invention has been made in view of the above circumstances, and an object of the present invention is to provide an optical access network which has high reliability for supporting information communication service and efficiently responds to an optical fiber demand which is difficult to predict.

Solution to Problem

In order to achieve the above-mentioned object, the optical access network according to the present invention has a loop-type wiring topology, is composed of a plurality of loop-shaped optical fiber cables, and has a core fiber switching function at a connection point between loops.

Specifically, the optical access network according to the present invention is an optical access network including an upper loop optical fiber cable which includes a plurality of fixed station lines and at least one common line and is laid on a loop-like path passing through a communication carrier base facility, and a lower loop optical fiber cable which includes at least one user line and at least one redundant line and is laid on a loop-like path passing through a connection point with the upper loop optical fiber cable and a user base facility, in which a fixed connection line for connecting the user lines and the fixed station lines in a 1:1 ratio, and an optical fiber switching function unit for exclusively connecting the redundant line and the common line are provided at the connection point, the number of the common lines is smaller than the total number of the redundant lines included in each of the plurality of lower loop optical fiber cables, and the optical fiber switching function unit switches connection between the redundant line and the common line according to demand fluctuation of the lower loop optical fiber cable.

Since the optical access network is composed of a plurality of loop-shaped optical fiber cables, a redundant path can be secured, and reliability can be enhanced. Further, the optical access network can make the optical fibers of a part of the upper loop optical fiber cables shared with a plurality of lower loop optical fiber cables, can switch connection according to demand, and can efficiently respond to the demand.

Therefore, the present invention can provide an optical access network which has high reliability for supporting information communication service and efficiently responds to difficult-to-predict optical fiber demand.

The optical access network according to the present invention preferably has the following conditions in order to reduce the frequency of construction and the like in response against the fluctuation of demand and to increase the availability.

In the optical access network, the loop-like path of the upper loop optical fiber cable is a path in which an improvement rate γ of availability in a case of the upper loop optical fiber cable is maximized with respect to availability when there is one path from the communication carrier base facility to the connection point in a wiring section where the lower loop optical fiber cable is laid.

Specifically, the improvement rate γ expressed by Expression C1, and the loop-like path of the upper loop optical fiber cable is $r_{loop}$ that maximizes the improvement rate γ,

[Math. C1]

$$\gamma = \frac{C_1 C_2 \sigma \theta r_{loop}(R^2 - r_{loop}^2)}{2 + C_1 C_2 \sigma \theta r_{loop}(R^2 - r_{loop}^2)} \tag{C1}$$

where an area shape constructed by the upper loop optical fiber cable is a fan shape having a center angle θ and a radius R with the communication carrier base facility as an origin, the $r_{loop}$ is a distance from the communication carrier base facility to the connection point, σ is a demand density, and C1 and C2 are constants.

In the optical access network according to the present invention, the number of optical fibers connecting the redundant line and the optical fiber switching function unit is a number that converges the number of optical fibers $F_{total}$ included in the upper loop optical fiber cable to a minimum.

Specifically, the optical fiber number $F_{total}$ is calculated by Expression C2:

[Math. C2]

$$F_{total} = \sum_{i=1}^{N}(1-a_i)f_i + F_c \tag{C2}$$

where N is the number of the lower loop optical fiber cables connected to the upper loop optical fiber cable, $a_i$ is the proportion of the number of the redundant lines among the optical fibers included in the i-th lower loop optical fiber cable (hereinafter, flexible optical fiber ratio), and $f_i$ is an optical fiber included in the i-th lower loop optical fiber cable, and Fc is the number of the common lines.

Here, $f_i$ satisfies Expression C3, and Fc satisfies Expression C4.

[Math. C3]

$$\sum_{k=0}^{2f_i} p_{i,k} \geq x \tag{C3}$$

x is a design value of reliability per wiring section where the lower loop optical fiber cable is laid, and $p_{i,k}$ is a probability that the number of demand generated in the i-th wiring section is k-core.

[Math. C4]

$$\sum_{k=0}^{2F_c} q_{N,k} \geq x^N \tag{C4}$$

$q_{N,k}$ is a probability that the total of the demand number exceeding the fixed station lines in the 1st to N-th wiring sections calculated by Expression C5 is k-core.

[Math. C5]

(Case of N = 1)   (C5)
$q_{1,k} = p_{1,(1-a)f_1+k}$
(Case of N > 1)

$$q_{N,k} = \sum_{i=0}^{k} q_{N-1,i} p_{N,(1-a)f_i+k-i}$$

The above inventions can be combined wherever possible.

Advantageous Effects of Invention

The present invention can provide an optical access network that has high reliability supporting information communication service and efficiently responds to difficult-to-predict optical fiber demand.

DESCRIPTION OF EMBODIMENTS

Figure 1:
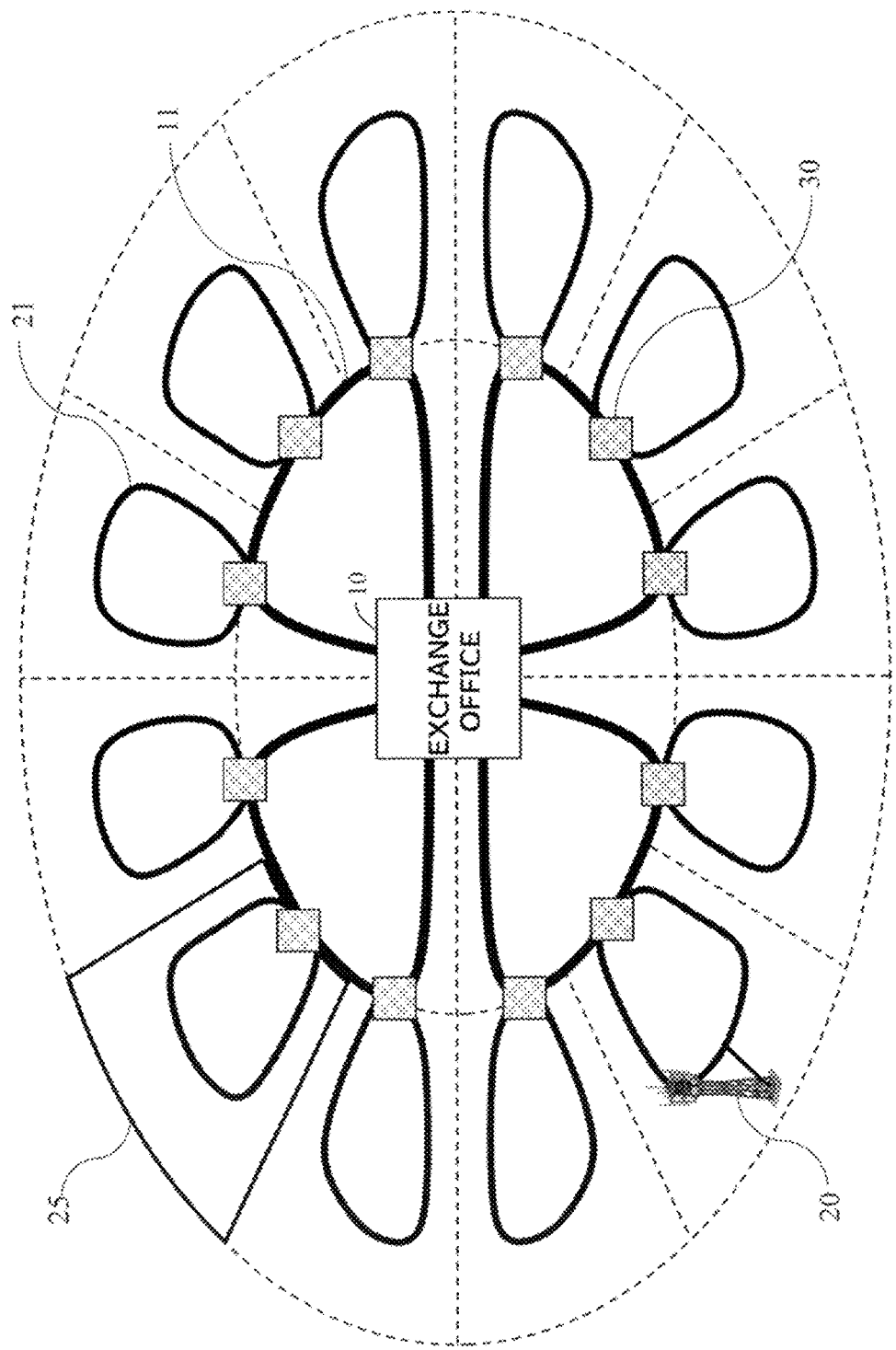
FIG. 1 is a diagram illustrating a configuration of an optical access network according to the present invention.

Embodiments of the present invention will be described with reference to accompanying drawings. The embodiments described below are examples of the present invention, and the present invention is not limited to the following embodiments. In the present specification and the drawings, the components having the same reference numerals indicate the same components.

Summary of Invention

Figure 2:
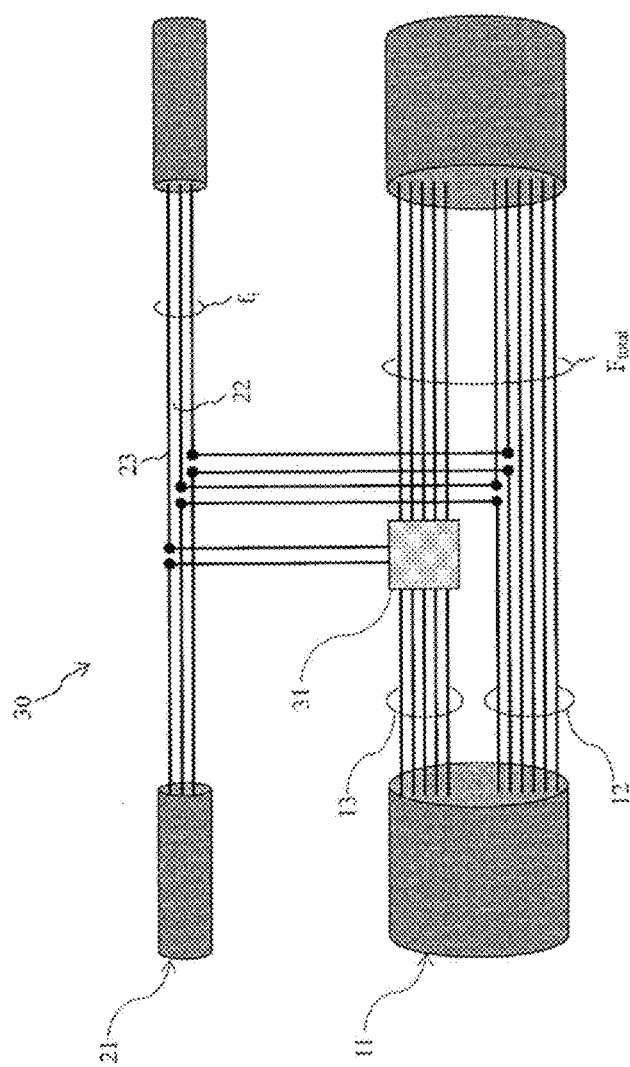
FIG. 2 is a diagram for illustrating core connection at a connection point connecting an upper loop and a lower loop of the optical access network according to the present invention.

FIG. 1 is a diagram illustrating a configuration of an optical access network according to the present embodiment. In addition, FIG. 2 is a diagram for illustrating optical fiber connection at a connection point connecting an upper loop and a lower loop of the optical access network according to the present embodiment. The optical access network includes:

an upper loop optical fiber cable 11 which includes a plurality of fixed station lines 12 and at least one common line 13 and is laid on a loop-like path passing through a communication carrier base facility 10, and a lower loop optical fiber cable 21 which includes at least one user line 22 and at least one redundant line 23 and is laid on a loop-like path passing through a connection point 30 with the upper loop optical fiber cable 11 and a user base facility 20, in which a fixed connection line 32 for connecting the user lines 22 and the fixed station lines 12 with one-to-one correspondence, and an optical fiber switching function unit 31 for exclusively connecting the redundant line 23 and the common line 13 are provided at the connection point 30, the number of common lines 13 is smaller than the total number of redundant lines 23 included in each of the plurality of lower loop optical fiber cables 21, and the optical fiber switching function unit 31 switches connection between the redundant line 23 and the common line 13 according to demand fluctuation of the lower loop optical fiber cable 21.

A wiring section 25 is an area where the lower loop optical fiber cable 21 is laid, and a user base 20 is installed. In the present embodiment, the communication carrier base facility 10 may be described as an "exchange office 10." The term "AVAILABILITY" is availability, and is a ratio obtained by dividing usable time (time excluding unusable time due to failure, construction, or the like) by total time.

The optical access network configuration includes the optical fiber cable 11 (hereinafter, an upper loop) that is looped to connect the wiring section 25 and the exchange office 10 together, the optical fiber cable 21 (hereinafter, a lower loop) that is looped and laid in each wiring section 25, and an optical fiber switching function unit 31 installed at the connection point 30 between the upper loop 11 and the lower loop 21. The optical fiber switching function unit 31 is a wiring board or an optical switch which can be switched by connector connection. The wiring board or the optical switch may be remotely controllable.

In this network configuration, the wiring section 25 is designed to have a size such that it touches the upper loop 11. Then, the upper loop 11 is designed to have such a size that an availability improvement rate $\gamma$ of the wiring section 25 connected to the upper loop 11 becomes a maximum. The availability improvement rate $\gamma$ is obtained by the following expression, where $\alpha_1$ is an availability upon setting one route connecting the exchange office 10 and the wiring section 25, and $\alpha_2$ is an availability upon setting two routes connecting the same.

[Math. 1]

$$\gamma = \frac{\alpha_2 - \alpha_1}{\alpha_1} \quad (1)$$

$\alpha_1$ and $\alpha_2$ are obtained by the following expressions.

[Math. 2]

$$\alpha_1 = \frac{1}{1 + \frac{\lambda}{\mu}} \quad (2)$$

[Math. 3]

$$\alpha_2 = \frac{1 + 2\frac{\lambda}{\mu}}{1 + 2\frac{\lambda}{\mu} + \left(\frac{\lambda}{\mu}\right)^2} \quad (3)$$

Here, $\lambda$ is a failure rate indicating the number of failures per unit time, and $\mu$ is a repair rate indicating the number of repair times per unit time.

Assuming that $\lambda$ is proportional to the cable length and $1/\mu$ is proportional to the number of optical fibers per cable, $\lambda$ and $\mu$ are described as follows.

[Math. 4]

$$\lambda = C_1 r_{loop} \quad (4)$$

[Math. 5]

$$\frac{1}{\mu} = \frac{C_2 \sigma \theta (R^2 - r_{loop}^2)}{2} \quad (5)$$

Figure 3:
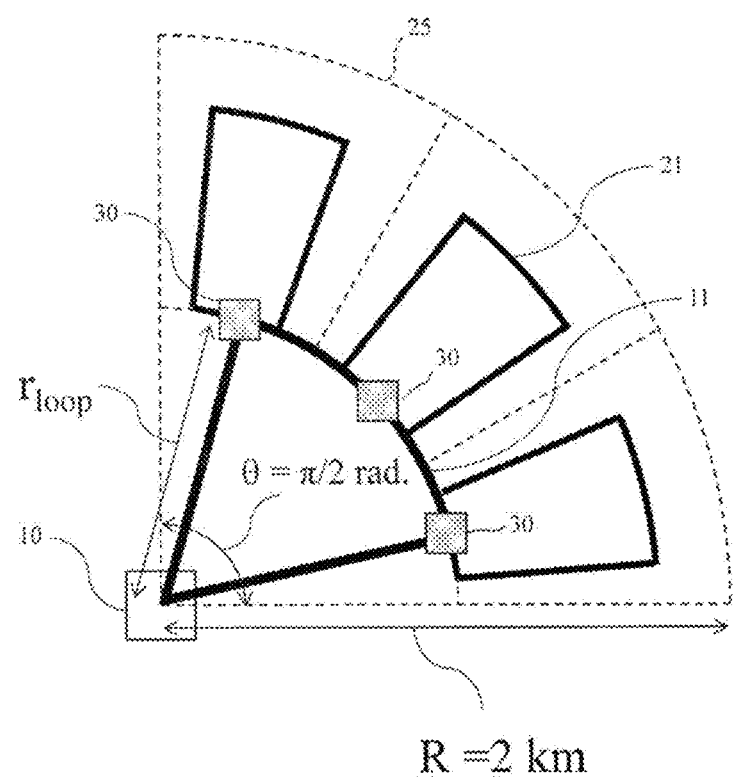
FIG. 3 is a diagram illustrating an example of an area model of the optical access network according to the present invention.

Here, as illustrated in FIG. 3, a fan-shaped area having a center angle $\theta$ and a radius R with the exchange office 10 as the origin is assumed as an area shape for constructing the upper loop 11 and the wiring section 25 adjacent to the upper loop 11. Here, $r_{loop}$ is a distance from the exchange office 10 to the far end of the upper loop 11, $\sigma$ is the demand density (the number of optical fibers demanded per unit area), and $C_1$ and $C_2$ are constants.

By substituting Expressions (2) to (5) into Expression (1), the following expression is obtained as a derivation equation for the availability improvement rate.

[Math. 6]

$$\gamma = \frac{C_1 C_2 \sigma \theta r_{loop} (R^2 - r_{loop}^2)}{2 + C_1 C_2 \sigma \theta r_{loop} (R^2 - r_{loop}^2)} \quad (6)$$

The size of the upper loop 11 is designed based on the condition of $r_{loop}$ that maximizes Expression (6).

The number of required optical fibers for the upper loop 11 (the total number of optical fibers included in the upper loop $F_{total}$) and the number of optical fibers connected to the optical fiber switching function unit 31 (the number of common lines 13 $F_c$) determines as follows. Considering fluctuations in the number of demand generated in the wiring section 25 (same as the above-mentioned "number of cores demanded"), the number of cores $F_{total}$ required to obtain a certain degree of reliability (probability of not requiring additional work) is obtained from the conditions for minimization. In other words, since the number of optical fibers $F_{total}$ changes under the number of common lines Fc, the number of user lines 22 and the number of redundant lines 23 of the lower loop 21, as shown in the FIG. 6, the number Fc of common lines, the number of user lines 22 and the number of redundant lines 23 of the lower loop 21 are determined so that the number of cores $F_{total}$ is minimized.

Hereinafter, a more detailed description will be given. FIG. 2 is a connection diagram of an optical fiber at a connection point between the upper loop 11 and the lower loop 21. The optical fiber of the upper loop 11 is composed of an optical fiber (fixed station line 12) directly connected to the lower loop 21 without being connected to the optical fiber switching function unit 31 and an optical fiber (common line 13) connected to the lower loop 21 via the optical fiber switching function unit 31. The common line 13 can be also connected to an optical fiber switching function unit 31 of another lower loop 21 to be shared by the plurality of lower loops 21 and to be used in any of the lower loops 21 by connection switching of the optical fiber switching function units 31. The number of required optical fibers $F_{total}$ of the upper loop 11 is obtained by the following expression.

[Math. 7]

$$F_{total} = \sum_{i=1}^{N}(1-a_i)f_i + F_c \qquad (7)$$

Here, N is the number of lower loops 21 connected to the upper loop 11, $a_i$ is the proportion of the number of the optical fibers (redundant lines 23) connected to the optical fiber switching function unit 31 to the required number $f_i$ of optical fibers of the i-th wiring section 25 (hereinafter, flexible optical fiber ratio), $f_i$ is the number of required optical fibers (the sum of the user line 22 and the redundant line 23) of the lower loop 21 in the i-th wiring section 25, and $F_c$ is the number of common lines 13.

Since the optical fiber cable laid in a loop shape can use the optical fiber from an arbitrary route in a clockwise direction and a counterclockwise direction, the demand of 2 $f_i$ cores at the maximum can be accommodated by the cable of the number of optical fibers $f_i$ in the i-th wiring section 25. When a design value of reliability per wiring section 25 is defined as x, it is necessary to make the probability that the number of demands generated in the i-th wiring section 25 is equal to or less than 2 $f_i$ cores designed to be equal to or more than x, so that $f_i$ is designed so as to satisfy the following expression. Here, x is referred to as "reliability per wiring section."

[Math. 8]

$$\sum_{k=0}^{2f_i} p_{i,k} \geq x \qquad (8)$$

Here, $p_{i,k}$ is the probability that the number of demand generated in the i-th wiring section 25 is k-core.

On the other hand, since the $F_c$ must be designed so that the probability that the total of the number of demands exceeding the fixed station line 12 is equal to or less than 2 $F_c$ cores in the 1st to N-th wiring sections 25 is equal to or more than $x^N$, the $F_c$ is designed so as to satisfy the following expression.

[Math. 9]

$$\sum_{k=0}^{2F_c} q_{N,k} \geq x^N \qquad (9)$$

Here, $q_{N,k}$ is the probability that the total of the demand numbers exceeding the number of fixed station lines 12 in the 1-th to N-th wiring sections 25 is k-core, and is obtained by the following expression.

[Math. 10]

(Case of $N = 1$) \qquad (10)
$q_{1,k} = p_{1,(1-a)f_1+k}$
(Case of $N > 1$)

$$q_{N,k} = \sum_{l=0}^{k} q_{N-1,l} p_{N,(1-a)f_i+k-l}$$

From the above, the number of required optical fibers $F_{total}$ of the upper loop 11 in the main network configuration is obtained so that $f_i$ (i=1 to N) obtained from Expression (8) and $F_c$ obtained from Expressions (9) and (10) are substituted into Expression (7). The number of optical fibers connected to the optical fiber switching function unit 31 of the i-th wiring section 25 is designed so that the number of optical fibers on the upper loop 11 side is $2F_c$ and the number of optical fibers on the lower loop 21 side is $a_i \times 2f_i$. The flexible optical fiber ratio $a_i$ at this time is designed so as to satisfy a condition that $F_{total}$ becomes minimum in $a_i$ dependency of $F_{total}$ calculated from Expression (7).

Effects of the Invention

Using a loop type wiring topology as the wiring topology, a redundant path is secured and reliability is improved, and optical fiber use efficiency is improved by sharing optical fiber resources between a clockwise route and a counterclockwise route of the loop. Further, by constituting the optical access network with a plurality of loops (an upper loop 11 and a lower loop 21), the above-mentioned effects can be obtained at any place of the optical access network.

The upper loop 11 secures a redundant configuration in a different path between the exchange office 10 and the wiring section 25, and makes optical fiber resources shared between the wiring sections 25. The lower loop 21 secures a redundant configuration in a different path between the connection point 30, with the upper loop 11, and the user base 20, and makes optical fiber resources shared between routes in the wiring section 25.

The optical fiber switching function unit 31 has an effect of reducing required switching work operation when a demand deviation different from prediction occurs between wiring sections 25 connected to the upper loop 11. As compared with fusion connection widely used in a conventional star-shaped network configuration, by preparing the optical fiber switching function unit 31 with a wiring board or an optical switch in advance, work operation time required for the connection switching can be reduced, and, upon allowing the wiring board or the optical switch to be remotely controlled, site work itself can be reduced.

Embodiments

Embodiments of the present invention will be described in conjunction with the accompanying drawings. Here, an optical access network configuration in the area illustrated in FIG. 3 will be described as an example. It is assumed that the area shape is a fan shape having a center angle $\theta=\pi/2$ radian with the exchange office 10 as an origin, and a radius R=2 km, an expected value of the number of demand generated per unit area is 100 core/km², the number of wiring sections 25 is 4 sections, and the areas of three wiring sections 25 connected to the upper loop 11 are equal to each other. $C_1$, $C_2$, x are assumed as $C_1=10^{-8}$, $C_2=0.1$, and x=0.9, respectively. The present invention is not limited to this, and may be used under area conditions different from those of the present embodiment.

Figure 4:
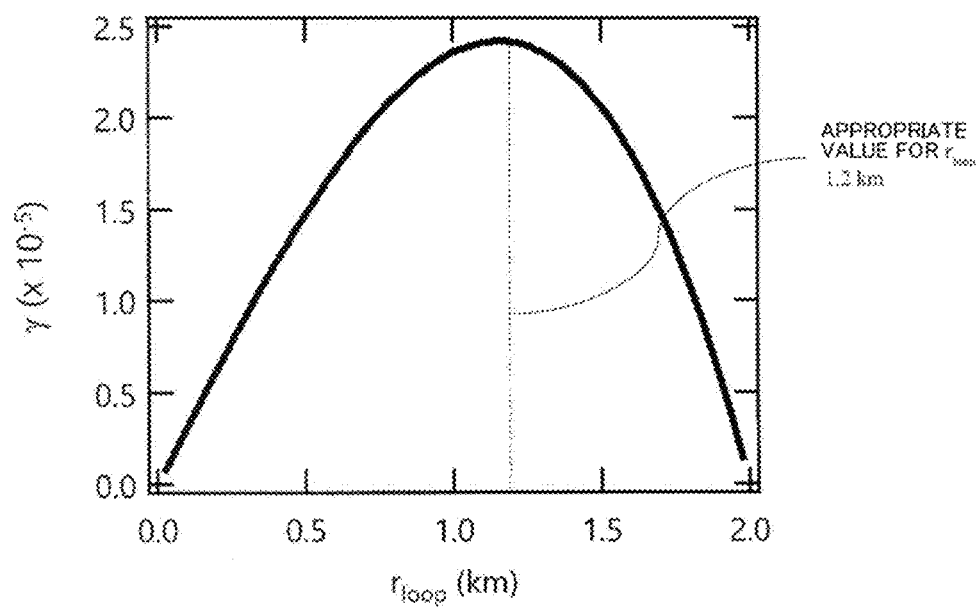
FIG. 4 is a diagram illustrating a loop scale dependence of an availability improvement rate calculated in the optical access network according to the present invention.

The size of the upper loop 11 is obtained from the $r_{loop}$ dependency of the availability improvement rate γ calculated from Expression (6). FIG. 4 shows the result of calculation of the $r_{loop}$ dependency of γ. As illustrated in FIG. 4, the upper loop 11 in the present embodiment is designed to have a size such that the distance from the exchange office 10 to the far end of the upper loop 11 is 1.2 km.

Figure 5:
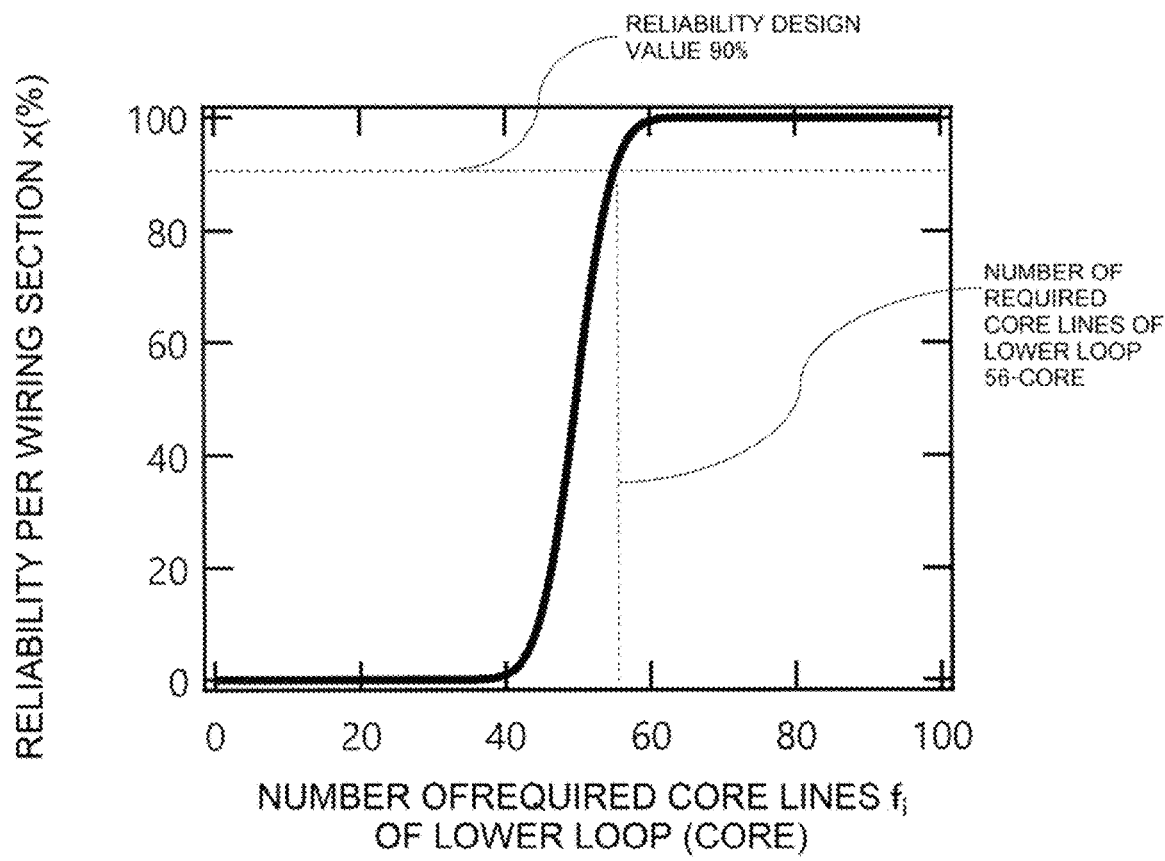
FIG. 5 is a diagram illustrating the dependence of the reliability per wiring section on the number of lower loop optical fibers calculated in the optical access network according to the present invention.

The number of required optical fibers $f_i$ of the lower loop 21 is designed so as to satisfy the condition of Expression (8). In the case of $r_{loop}$=1.2 km, since the area of each wiring section 25 connected to the upper loop 11 becomes 0.67 km², the expected value of the number of demand generated in each wiring section 25 becomes 67-cores. FIG. 5 is a result of calculation of the dependence of the reliability x per wiring section 25 on the number of optical fibers of the lower loop 21 in the present embodiment. Here, a normal distribution of an expected value of 67-cores and a standard deviation of √67-cores is assumed as a probability density function of the number of demand generated per wiring section 25. Referring to FIG. 5, the number of required optical fibers of the lower loop 21 in the present embodiment is 56-cores.

Figure 6:
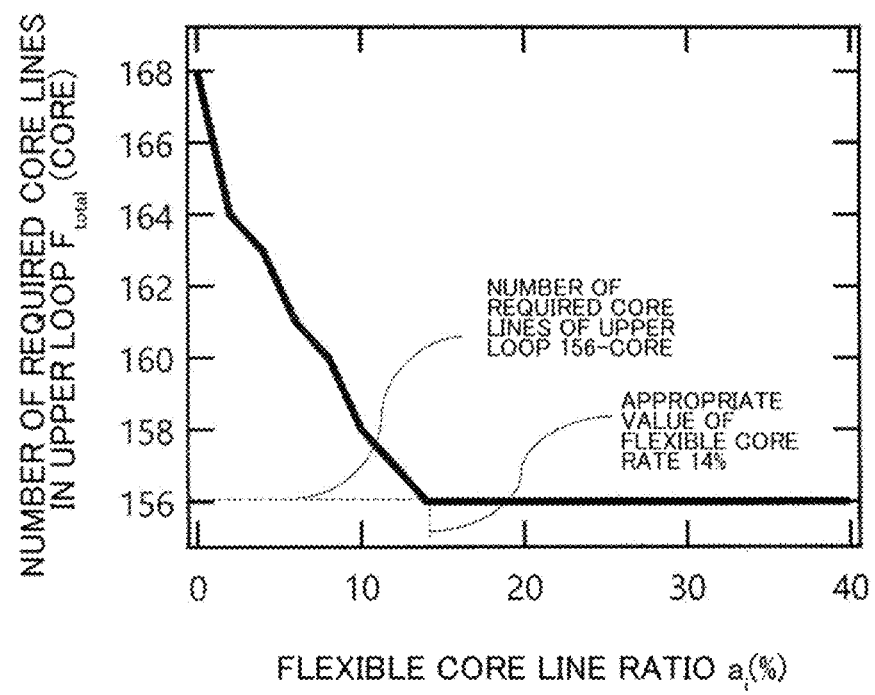
FIG. 6 is a diagram illustrating the flexible optical fiber ratio dependency of the number of required optical fibers of an upper loop calculated in the optical access network according to the present invention.

The number of required optical fibers $F_{total}$ and the flexible optical fiber ratio $a_i$ of the upper loop 11 are obtained from the flexible optical fiber ratio dependency of $F_{total}$ calculated from Expression (7). FIG. 6 shows the calculation result of the flexible optical fiber rate dependency of the number of required optical fibers of the upper loop 11 in the present embodiment. In the present embodiment, the same flexible optical fiber rate a is calculated in all the wiring sections. As illustrated in FIG. 6, since $F_{total}$ converges to 156-cores of the minimum value at the flexible optical fiber ratio of equal to or more than 14%, the number of required optical fibers of the upper loop 11 in the present embodiment is 156-cores. In a case where the flexible optical fiber rate is higher than 14%, the number of required optical fibers of the upper loop 11 is not changed, and the number of connections of the optical fiber switching function unit 31 is increased. In order to avoid complication of the optical fiber switching function unit 31, the proper value of the flexible optical fiber rate in the present embodiment is 14%.

The total number of optical fibers connected to the optical fiber switching function unit 31 (the connection optical fibers 33 connected to the lower loop 11 and the clockwise and counterclockwise common lines 13 of the upper loop) is calculated as follows.

The number of connected optical fibers on the upper loop 11 side (the number of clockwise and counterclockwise common lines 13 connected to the optical fiber switching function unit 31) is calculated by following expression.

2×(number of required optical fibers of upper loop 11)−2×(1−flexible optical fiber ratio)×(number of required optical fibers of lower loop 21)×(number of wiring sections 25)=2×$F_{total}$−2×(1−$a_i$)×$f_i$×N The number of connected optical fibers on the lower loop 21 side (the number of connected optical fibers 33 connected to the optical fiber switching function unit 31) is calculated by following expression.

2×(flexible optical fiber ratio)×(number of required optical fibers for lower loop 21)=2×$a_i$×$f_i$ Upon making calculation in the example described with reference to FIGS. 3 to 6, ($F_{total}$=156, a=0.14, $f_i$=56, N=3), the number of connected optical fibers on the upper loop 11 side is 2×156−2×(1−0.14)×56×3≈24 (cores), and the number of connected optical fibers on the lower loop 21 side is 2×0.14×56≠16 (cores).

In this case, the number of common lines 13 is 12 and the number of redundant lines 23 is 8.

As described above, the number of connected optical fibers on the upper loop side is designed not to be equal to the total number of optical fibers connecting the plurality of lower loops and the optical fiber switching function unit, but to be smaller than the total number. For example, in the above example, since the number of connected optical fibers on the lower loop 21 side is 16-cores and the number of lower loops 21 is 3, the total number is 48-cores, but the number of connected optical fibers on the upper loop 11 side is 24-cores smaller than the total number of 48-cores. That is, the clockwise and counterclockwise 24-cores of the common line 13 of the upper loop 11 are shared by the three lower loops 21, and each lower loop 21 can use any 16-cores of the 24-cores. This can produce a global grouping effect that the optical fiber switching function unit 31 can deal with the demand fluctuation with the number of optical fibers smaller than the total number by handling the demand fluctuation of each lower loop 21 as the demand fluctuation of the whole three lower loops.

APPENDIX

Figure 7:
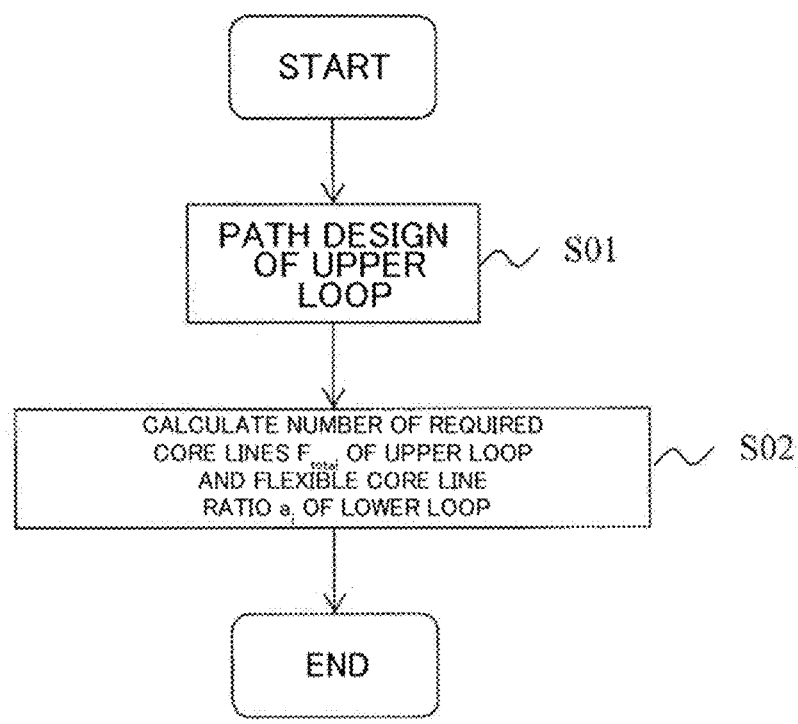
FIG. 7 is a diagram illustrating a design method for the optical access network according to the present invention.

This optical access network can be designed as illustrated in FIG. 7.

(1) The optical access network includes
an upper loop optical fiber cable which includes a plurality of fixed station lines and at least one common line and is laid on a loop-like path passing through a communication carrier base facility, and
a lower loop optical fiber cable which includes at least one user line and at least one redundant line and is laid on a loop-like path passing through a connection point with the upper loop optical fiber cable and a user base facility, in which
a fixed connection line for connecting the user line and the fixed station lines in a 1:1 ratio, and an optical fiber switching function unit for exclusively connecting the redundant line and the common line are provided at the connection point,
the number of the common lines is smaller than the total number of the redundant lines included in each of the plurality of lower loop optical fiber cables, and
the optical fiber switching function unit switches connection between the redundant line and the common line according to demand fluctuation of the lower loop optical fiber cable.

The optical access network is designed by performing steps S01 and S02.

(2) In step S01,
the loop-like path of the upper loop optical fiber cable is a path in which an improvement rate γ of availability in a case of the upper loop optical fiber cable is maximized with respect to availability when there is one path from the communication carrier base facility to the connection point in a wiring section where the lower loop optical fiber cable is laid.

(3) Specifically,
the improvement rate γ expressed by Expression C1, and the loop-like path of the upper loop optical fiber cable is $r_{loop}$ that maximizes the improvement rate γ.

[Math. C1]

$$\gamma = \frac{C_1 C_2 \sigma \theta r_{loop}(R^2 - r_{loop}^2)}{2 + C_1 C_2 \sigma \theta r_{loop}(R^2 - r_{loop}^2)} \quad (C1)$$

Where an area shape constructed by the upper loop optical fiber cable is a fan shape having a center angle θ and a radius R with the communication carrier base facility as an origin, the $r_{loop}$ is a distance from the communication carrier base facility to the connection point, σ is a demand density, and C1 and C2 are constants.

(4) In step S02,
the number of optical fibers connecting the redundant line and the optical fiber switching function unit is a number that converges the number of optical fibers $F_{total}$ included in the upper loop optical fiber cable to a minimum.

(5) Specifically,
the optical fiber number $F_{total}$ is calculated by Expression C2:

[Math. C2]

$$F_{total} = \sum_{i=1}^{N}(1-a_i)f_i + F_c \quad (C2)$$

where N is the number of the lower loop optical fiber cables connected to the upper loop optical fiber cable, $a_i$ is the proportion of the number of the redundant lines among the optical fibers included in the i-th lower loop optical fiber cable (hereinafter, flexible optical fiber ratio), and $f_i$ is an optical fiber included in the i-th lower loop optical fiber cable, and Fc is the number of the common lines.

Here, $f_i$ satisfies Expression C3, and Fc satisfies Expression C4.

[Math. C3]

$$\sum_{k=0}^{2f_i} p_{i,k} \geq x \quad (C3)$$

x is a design value of reliability per wiring section where the lower loop optical fiber cable is laid, and $p_{i,k}$ is a probability that the number of demand generated in the i-th wiring section is k-core.

[Math. C4]

$$\sum_{k=0}^{2F_c} q_{N,k} \geq x^N \quad (C4)$$

$q_{N,k}$ is a probability that the total of the demand number exceeding the fixed station lines in the 1st to N-th wiring sections calculated by Expression C5 is k-core.

[Math. C5]

(Case of N = 1)
$q_{1,k} = p_{1,(1-a)f_i+k}$
(Case of N > 1)

$$q_{N,k} = \sum_{l=0}^{k} q_{N-1,l} p_{N,(1-a)f_i+k-l} \quad (C5)$$

REFERENCE SIGNS LIST

10: Communication carrier base facility (exchange office)
11: Upper loop optic fiber cable
12: Fixed station line
13: Common line
20: User base facility
21: Lower loop optical fiber cable
22: User line
23: Redundant line
25: Wiring section
30: Connection point
31: Optical fiber switching function unit
32: Fixed connection line
33: Connection optical fiber

The invention claimed is:

1. An optical access network comprising:
an upper loop optical fiber cable which includes a plurality of fixed station lines and at least one common line and is laid on a loop-like path passing through a communication carrier base facility; and
a lower loop optical fiber cable of a plurality of lower loop optical fiber cables which includes at least one user line and at least one redundant line and is laid on a loop-like path passing through a connection point with the upper loop optical fiber cable and a user base facility,
wherein
a fixed connection line for connecting the user line and the fixed station lines in a 1:1 ratio, and an optical fiber switching function unit for exclusively connecting the redundant line and the common line are provided at the connection point,
the number of the common lines is smaller than the total number of the redundant lines included in each of the plurality of lower loop optical fiber cables, and
the optical fiber switching function unit switches connection between the redundant line and the common line according to demand fluctuation of the lower loop optical fiber cable.

2. The optical access network according to claim 1, wherein the loop-like path of the upper loop optical fiber cable is a path in which an improvement rate γ of availability in a case of the upper loop optical fiber cable is maximized with respect to availability when there is one path from the communication carrier base facility to the connection point in a wiring section where the lower loop optical fiber cable is laid.

3. The optical access network according to claim 2, wherein the improvement rate γ expressed by Expression C1, and
the loop-like path of the upper loop optical fiber cable is $r_{loop}$ that maximizes the improvement rate γ:

[Math. C1]

$$\gamma = \frac{C_1 C_2 \sigma \theta r_{loop}(R^2 - r_{loop}^2)}{2 + C_1 C_2 \sigma \theta r_{loop}(R^2 - r_{loop}^2)} \quad (C1)$$

where an area shape constructed by the upper loop optical fiber cable is a fan shape having a center angle θ and a radius R with the communication carrier base facility as an origin, the $r_{loop}$ is a distance from the communication carrier base facility to the connection point, σ is a demand density, and C1 and C2 are constants.

4. The optical access network according to claim 1, wherein the number of optical fibers connecting the redundant line and the optical fiber switching function unit is a number that converges the number of optical fibers $F_{total}$ included in the upper loop optical fiber cable to a minimum.

5. The optical access network according to claim 4, wherein the optical fiber number $F_{total}$ is calculated by Expression C2:

[Math. C2]

$$F_{total} = \sum_{i=1}^{N}(1 - a_i)f_i + F_c \quad (C2)$$

where N is the number of the lower loop optical fiber cables connected to the upper loop optical fiber cable, $a_i$ is the proportion of the number of the redundant lines among the optical fibers included in the i-th lower loop optical fiber cable (hereinafter, flexible optical fiber ratio), and $f_i$ is an optical fiber included in the i-th lower loop optical fiber cable, and Fc is the number of the common lines, here, $f_i$ satisfies Expression C3, and Fc satisfies Expression C4,

[Math. C3]

$$\sum_{k=0}^{2f_i} p_{i,k} \geq x \quad (C3)$$

x is a design value of reliability per wiring section where the lower loop optical fiber cable is laid, and $p_{i,k}$ is a probability that the number of demand generated in the i-th wiring section is k-core,

[Math. C4]

$$\sum_{k=0}^{2F_c} q_{N,k} \geq x^N \quad (C4)$$

$q_{N,k}$ is a probability that the total of the demand number exceeding the fixed station lines in the 1st to N-th wiring sections calculated by Expression C5 is k-core,

[Math. C5]

(Case of $N = 1$)  (C5)
$q_{1,k} = p_{1,(1-a)f_i+k}$
(Case of $N > 1$)
$$q_{N,k} = \sum_{l=0}^{k} q_{N-1,l}\, p_{N,(1-a)f_i+k-l}.$$

* * * * *